US012096762B2

(12) United States Patent
Casalanguida (10) Patent No.: US 12,096,762 B2
(45) Date of Patent: Sep. 24, 2024

(54) APPARATUS FOR THE CAPTURE AND ELECTROCUTION OF PEST ANIMALS

(71) Applicant: APICE S.R.L., Atessa (IT)

(72) Inventor: Andrea Casalanguida, Atessa (IT)

(73) Assignee: APICE S.R.L., Atessa (IT)

( * ) Notice: Subject to any disclaimer, the term of this patent is extended or adjusted under 35 U.S.C. 154(b) by 68 days.

(21) Appl. No.: 18/181,759

(22) Filed: Mar. 10, 2023

(65) Prior Publication Data
US 2023/0301293 A1  Sep. 28, 2023

(30) Foreign Application Priority Data
Mar. 11, 2022  (IT) ........................ 102022000004679

(51) Int. Cl.
*A01M 23/38* (2006.01)
*A01M 23/02* (2006.01)

(52) U.S. Cl.
CPC ............ *A01M 23/38* (2013.01); *A01M 23/02* (2013.01)

(58) Field of Classification Search
CPC .............................. A01M 23/02; A01M 23/38
See application file for complete search history.

(56) References Cited

U.S. PATENT DOCUMENTS

| 5,519,962 | A  | * | 5/1996  | Cerullo ................. | A01M 23/04 43/72 |
| 6,088,948 | A  | * | 7/2000  | Rønnau ................. | A01M 23/12 43/72 |
| 6,735,899 | B1 | * | 5/2004  | Anderson ............. | A01M 23/04 43/98 |
| 7,219,466 | B2 | * | 5/2007  | Rich ...................... | A01M 23/38 43/98 |
| 8,418,398 | B2 |   | 4/2013  | Bucher et al.         |                   |
| 11,172,670 | B2 | * | 11/2021 | Round .................. | A01M 23/12 |
| 2012/0240450 | A1 | * | 9/2012  | Bucher ................. | A01M 23/14 43/124 |

FOREIGN PATENT DOCUMENTS

| CN | 205922661 U | 2/2017 |
| CN | 110521714 A | 12/2019 |

OTHER PUBLICATIONS

Italian Search Report for Patent Application No. IT 2022000004679, mailed Oct. 26, 2022, Munich, DE.

* cited by examiner

*Primary Examiner* — Richard G Davis
(74) *Attorney, Agent, or Firm* — Armstrong Teasdale LLP (57) ABSTRACT

An apparatus for the capture and electrocution of pest animals is provided. The apparatus has a killing chamber, an electric accumulator, a high voltage transformer, three electrode plates located in the killing chamber and connectable to the high voltage transformer, and three stationary electrical contacts. A rotor having a horizontal rotating shaft and four axial walls, each with three electrode plates arranged consecutively in an axial direction, is lockable in four predetermined angular positions in each of which one of the four axial walls is horizontal and has the three electrode plates facing the killing chamber. Each axial wall of the rotor has three movable electrical contacts that are each connected to a respective one of the three electrode plates. The three movable contacts on a same one of the axial walls are temporarily and simultaneously connectable to respective stationary electrical contacts when the axial wall is horizontal.

11 Claims, 10 Drawing Sheets

APPARATUS FOR THE CAPTURE AND ELECTROCUTION OF PEST ANIMALS

CROSS-REFERENCE TO RELATED APPLICATION

This application claims priority to Italian Patent Application No. 102022000004679 filed Mar. 11, 2022, the entire contents of which is hereby incorporated in its entirety by reference.

FIELD OF THE INVENTION

The present invention relates to an apparatus for catching and electrocuting pest animals.

BACKGROUND OF THE INVENTION

Traps for capturing and killing animals by electrocution have been proposed as more effective and less cruel than apparatus that involves killing the animal in other ways.

U.S. Pat. No. 8,418,398 B2 discloses an electronic mouse trap with multiple kill and automatic killing chamber capabilities. The trap includes an elevated killing chamber rotatably mounted on a base that houses a collection bin positioned below the chamber and having an entrance pathway that provides rodents with access to the chamber. Upon completion of a killing cycle and the killing of a mouse, the chamber is automatically rotated by a gear motor about a longitudinal axis that is placed under the floor of the chamber. The chamber rotates approximately 180 degrees so that it is inverted, allowing the dead mouse to fall downwards into the collection bin. Once the chamber has been inverted and the mouse carcass removed by gravity, the gear motor reverses direction and returns the chamber to its upright position where it is ready to reinitiate the killing cycle for another mouse.

U.S. Pat. No. 6,735,899 B1 discloses an electric mouse trap having a casing that includes a pair of spaced apart electrodes or charge plates in a killing chamber intermediate between a trap entrance and a bait. At least one diverter is interposed along the pathway to the electrodes to discourage the animal from reversing direction before being electrocuted. A deflector septum or barrier is carried by the lid of the casing to extend into the space between the electrodes when the lid is closed. The lower edge of the barrier is spaced from the floor of the casing by a limited distance to force the animal to crawl under the barrier to reach a bait located beyond a more distant electrode. When the animal touches two electrodes simultaneously, it closes a circuit, generating a high-voltage shock that electrocutes it. The barrier prevents the prey from instinctively retreating at the moment of electrocution.

U.S. Pat. No. 7,219,466 B2 discloses a single-use mouse trap having a base on which three conductor plates are installed: a first electrode plate installed towards a wall, a second, wider intermediate electrode plate, and a third electrode plate closer to the entrance.

SUMMARY OF THE INVENTION

It is an object purpose of the present invention to provide an optimised trap, with multiple killing capabilities, capable of effectively neutralising pest rodents of different sizes.

The above and other objects and advantages, which will be better understood hereinafter, are achieved according to the present invention by a trap having the features set forth in the appended claims.

In summary, an apparatus for the capture and electrocution of pest animals comprises a casing defining a two-storey structure inside it, with an upper level, comprising an elongated killing chamber with a feeder at a first end of the killing chamber containing food bait, an entrance at a second end opposite the first end, and a lower level, with a bin for the collection and temporary storage of the corpses of killed animals. The apparatus comprises electrocution means that include an electric accumulator, a high voltage transformer connected to the electric accumulator, a plurality of electrode plates located in the killing chamber and electrically and selectively connectable to the high voltage transformer, and an activation member for activating the electrocution means associated with the feeder. The apparatus also comprises a rotor comprising a rotatable shaft which extends along a horizontal axis inside the casing at an intermediate height, with four axial walls arranged orthogonally to one another along the shaft. Each of the four axial walls has a face providing three electrode plates of the plurality of electrode plates arranged consecutively in an axial direction. The rotor is temporarily lockable in one of four predetermined angular positions, in each of which one of the four axial walls is arranged horizontally and has its three electrode plates facing upwards to form part of the killing chamber floor. The electrocution means comprise three stationary electrical contacts. Each axial wall of the rotor is provided with three movable electrical contacts, each connected to a respective one of three electrode plates located on the same wall. The three electrical contacts can be connected temporarily and simultaneously to the respective stationary electrical contacts when the axial wall is temporarily blocked horizontally with the three electrode plates facing upwards.

BRIEF DESCRIPTION OF THE DRAWINGS

Features and advantages of an apparatus according to the present invention will be evident from the following description, which is given by way of non-limiting example. Reference is made to the accompanying drawings, in which.

DETAILED DESCRIPTION

Figure 1:
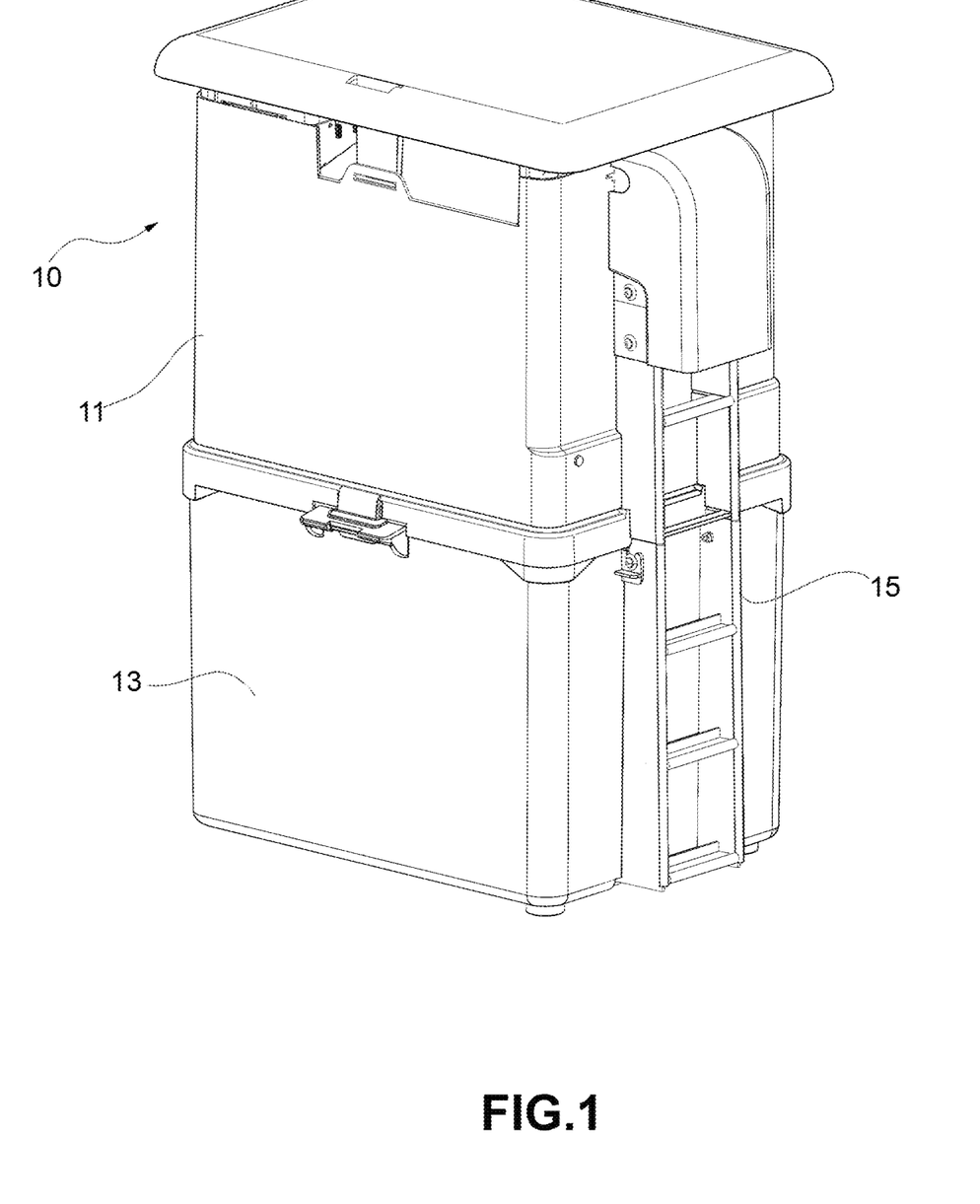
FIG. 1 is a perspective view of the outside of an apparatus according to an embodiment of the present invention.
Figure 2:
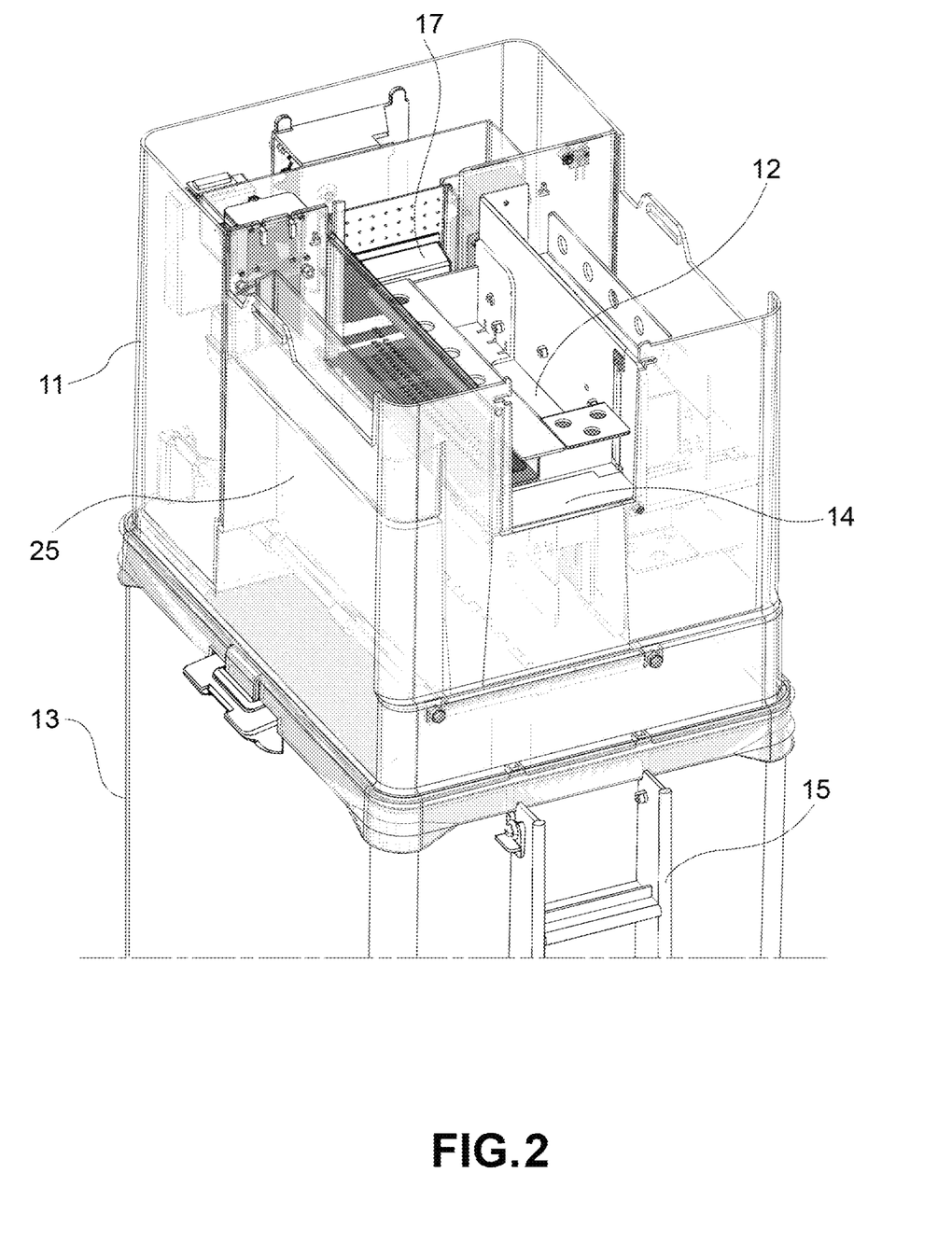
FIG. 2 is a perspective view of the outside of the apparatus in FIG. 1, without cover and illustrated in partial transparency to show some internal parts.

With reference to the drawings, an apparatus for the capture and electrocution of pest animals, such as rats and mice, is indicated as a whole by numeral 10 (FIG. 1). The apparatus 10 comprises a closed outer casing 11, internally subdivided as a two-storey structure, with an upper level comprising a killing chamber 12 in which the animals accessing it are killed by electrocution, and a lower level, in which there is a bin 13 for the collection and temporary storage of the corpses of the killed animals (FIG. 2).

The outer casing has a single entrance 14, located on the upper level, which prey can access via an external access pathway 15, in the example illustrated a staircase or ramp pathway.

Figure 3:
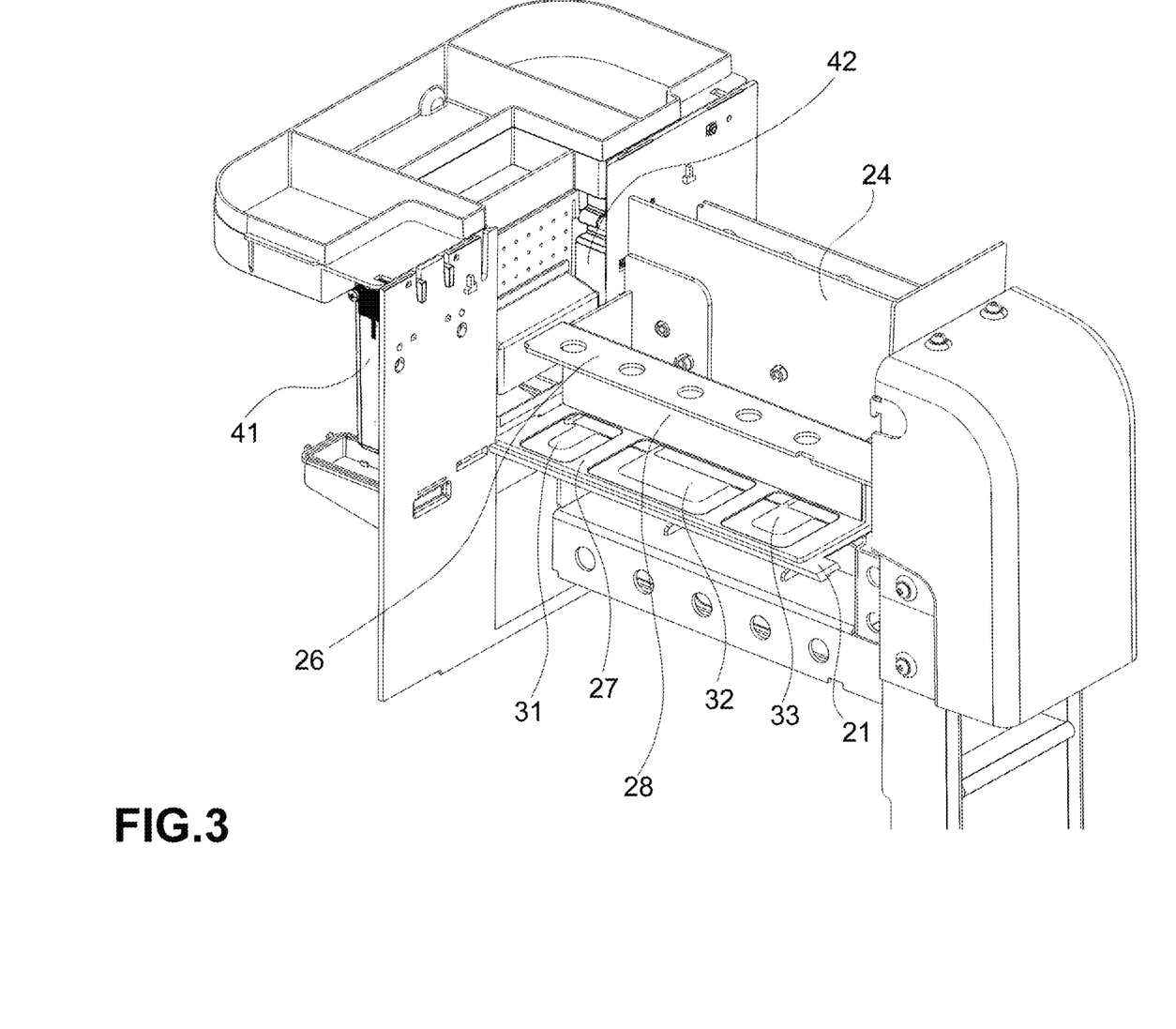
FIG. 3 is a perspective view of some of the internal and external components of the apparatus of FIGS. 1 and 2.

At the upper level, the killing chamber has an elongated shape in a direction defined herein as axial, parallel to a horizontal direction in which a rotatable shaft 16 extends, which is arranged internally to the housing, at an intermediate height. The rotatable shaft 16 is part of a rotor 20 having four axial walls 21, 22, 23, 24 arranged orthogonally to each other, which contribute two by two to define at least two consecutive walls of the killing chamber, depending on the angular position taken by the rotor with respect to the casing (FIGS. 3 and 4).

Figure 5:
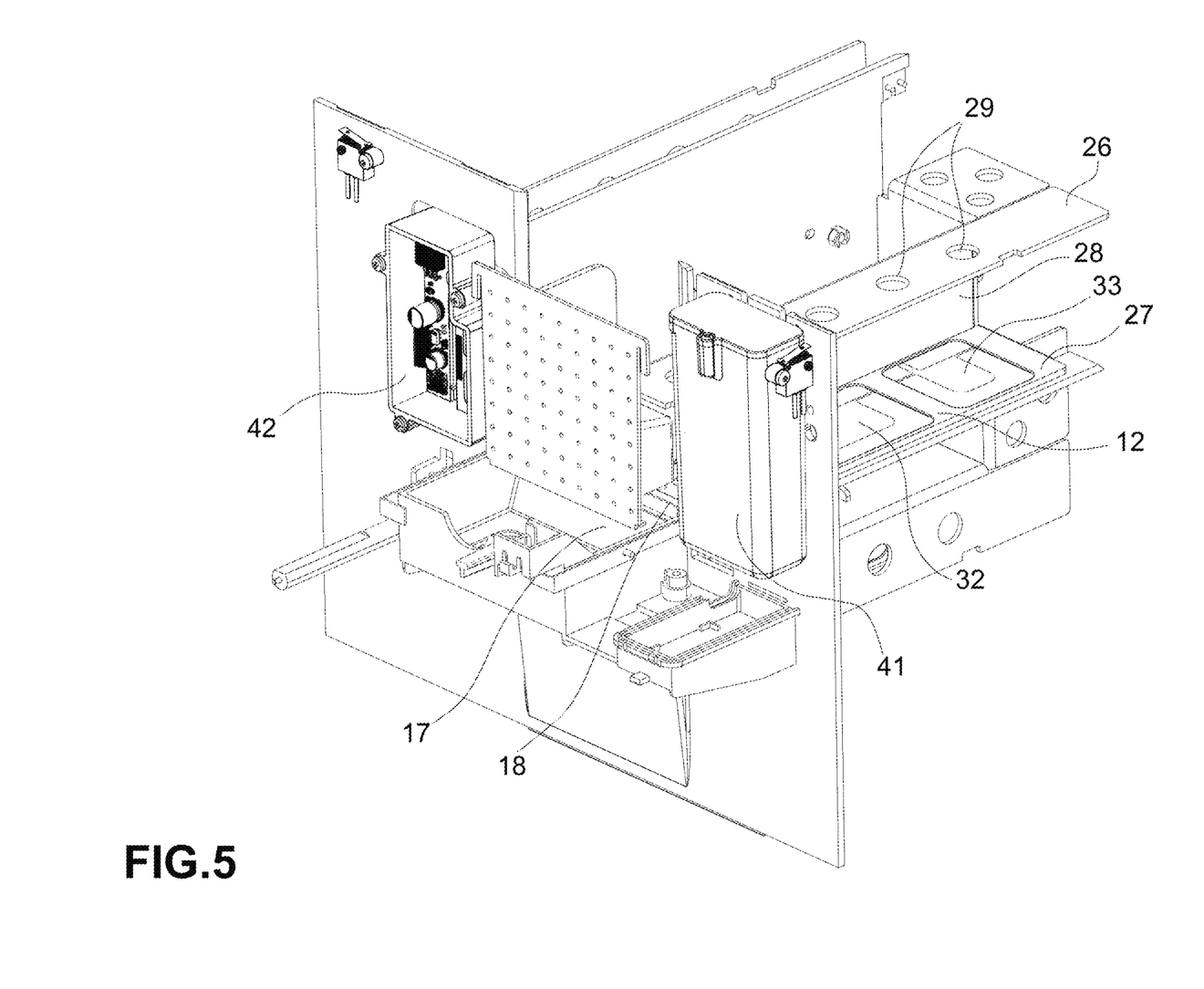
FIG. 5 is a perspective view similar to FIG. 4, but from a different angle.

The killing chamber 12 has two axially opposite ends, at one of which an entrance 14 is provided. At the second axial end of the killing chamber, a feeder 17 is provided for holding a prey bait. The feeder 17 has an upper horizontal edge, facing the killing chamber, along which an activation member 18 is provided, capable of being physically touched and moved by the prey as it faces the feeder to eat. As it eats, the prey exerts pressure on the lever actuating member, triggering the delivery of an electric shock (FIG. 5).

In addition to or as an alternative to the activation member 18, a pressure sensor (not shown) may be provided in the vicinity of the feeder 17 which, activated by the prey, triggers the electric shock.

Figure 4:
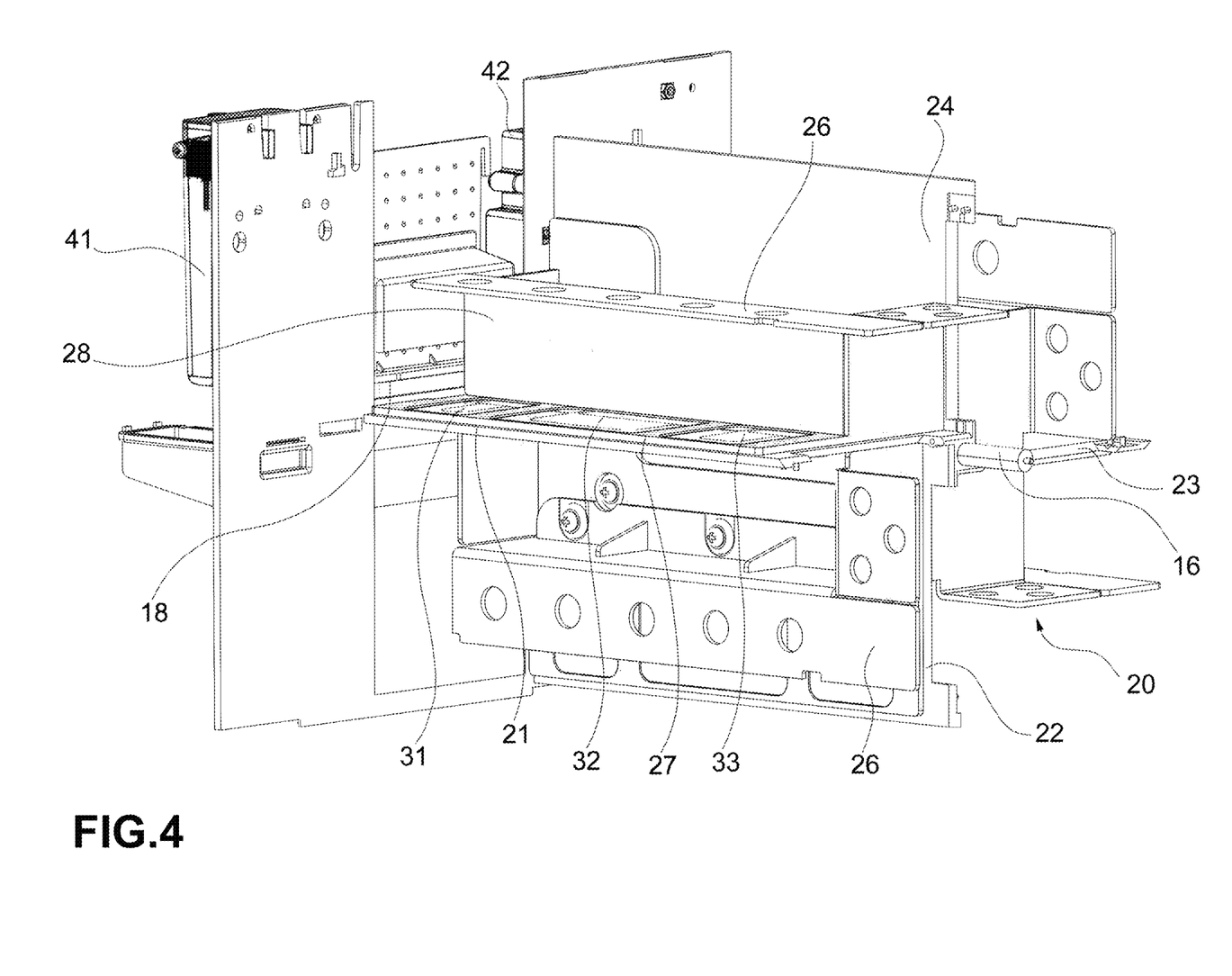
FIG. 4 is a perspective view of some internal components of the apparatus of FIGS. 1 and 2.

The killing chamber has an overall parallelepiped shape, and is bounded by four orthogonal walls: an outer side wall 25 is defined by an inner surface of the casing; an inner side wall 28, internal with respect to the outer side wall 25, is presented by an axial wall revolving with the shaft; a lower horizontal wall 27, constituting part of the floor of the killing chamber, is presented by another axial wall revolving with the shaft; a top horizontal wall 26, defining a ceiling for the killing chamber, is preferably carried by the rotor as a wall parallel to the lower horizontal wall 27 (FIG. 4).

Figure 6:
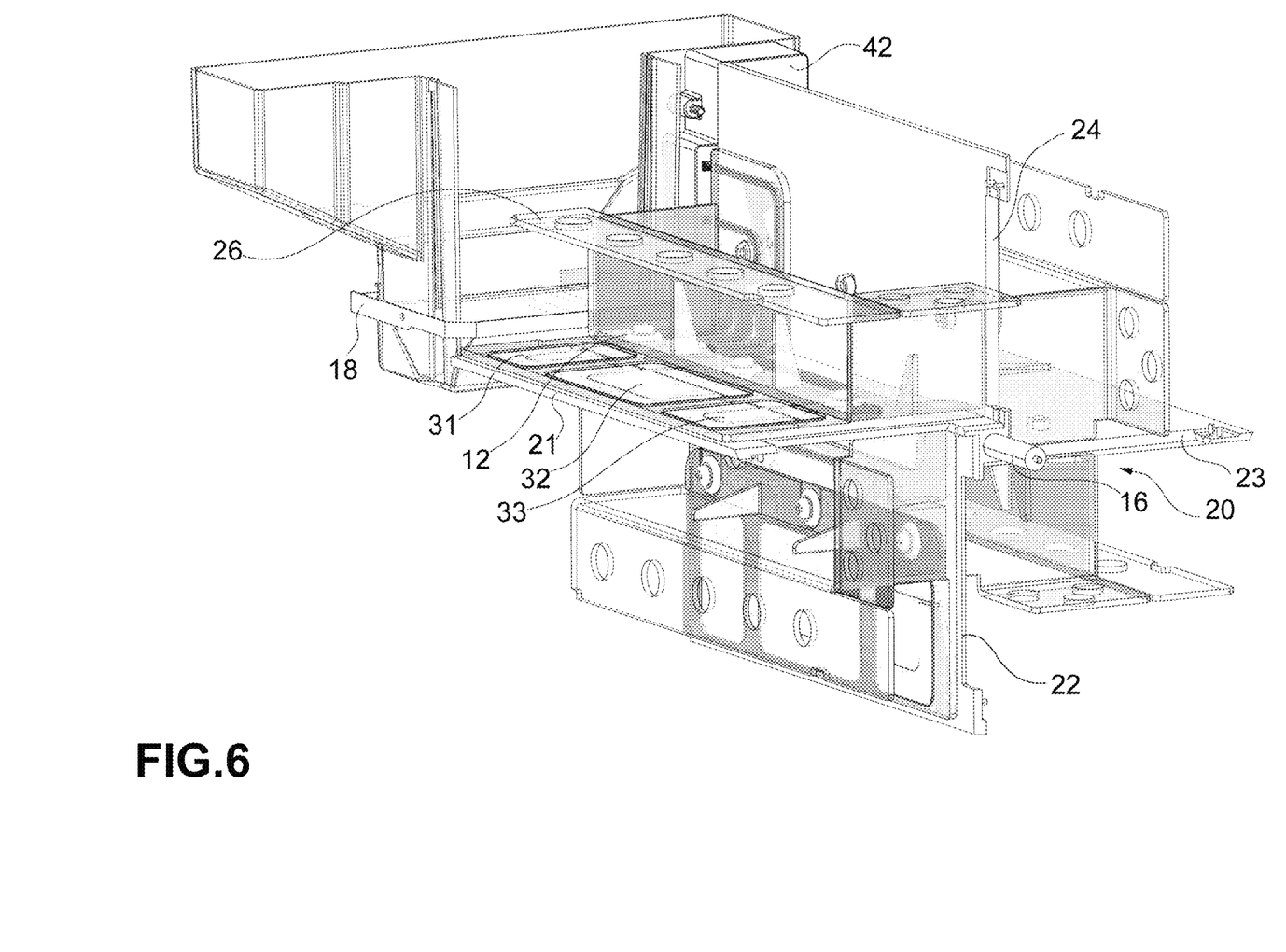
FIG. 6 is a perspective view of some internal components of the apparatus of FIGS. 1 and 2, illustrated in partial transparency to show some hidden parts.
Figure 7:
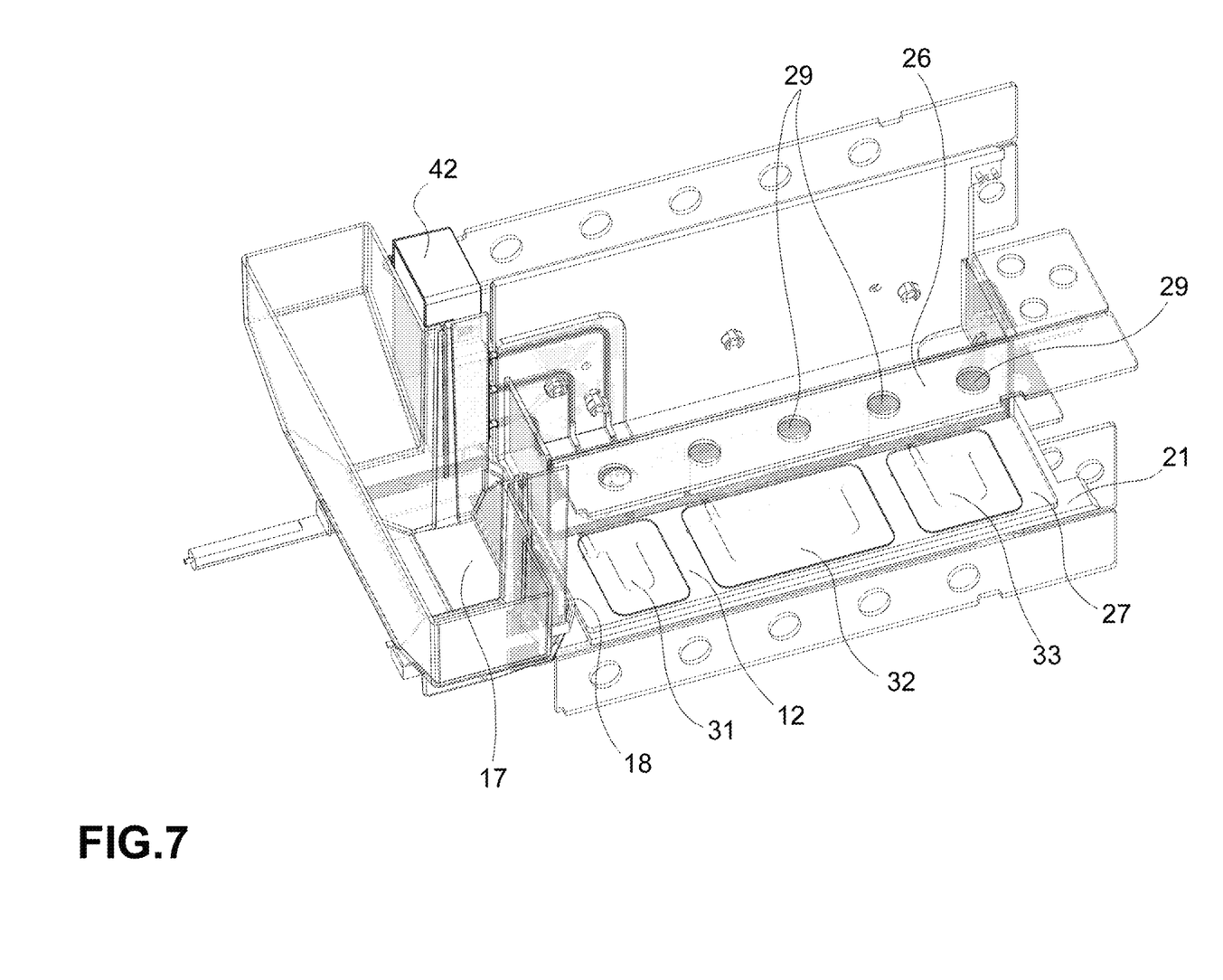
FIG. 7 is a perspective view similar to FIG. 6, but from a different angle.

Each of the four axial walls 21-24 of the rotor has a face, which is configured to face upwards when that axial wall is arranged horizontally, in order to act as the floor of the killing chamber, where three electrode plates 31, 32, 33 are arranged consecutively in an axial direction (FIGS. 6 and 7). Each electrode plate extends transversely across substantially the entire width or transverse dimension of the killing chamber. The three electrode plates are sized and distributed in the axial direction so as to occupy substantially the entire axial length of the killing chamber.

Inside the casing is an electric battery 41 and a high-voltage transformer 42 (FIGS. 4 and 5) to raise the battery voltage for example from about 3.7V to about 9000V.

Figure 8:
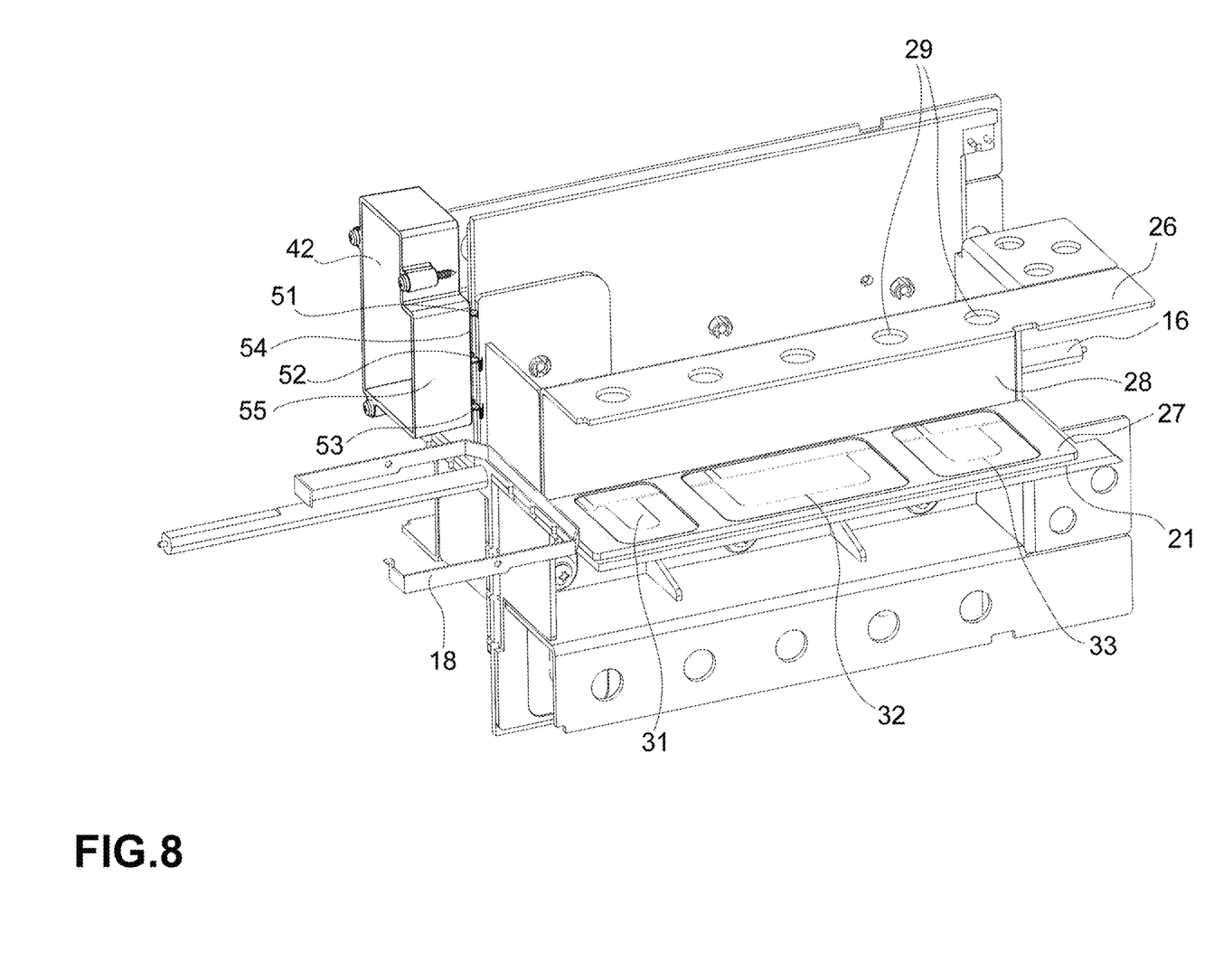
FIG. 8 is a perspective view of some of the internal components of the apparatus in FIGS. 1 and 2.

Three stationary electrical contacts 51, 52, 53 are radially spaced from each other along an edge 54 of a part integral to the casing, e.g, a wall 55 of the high-voltage transformer 42 (FIG. 8).

Figure 9:
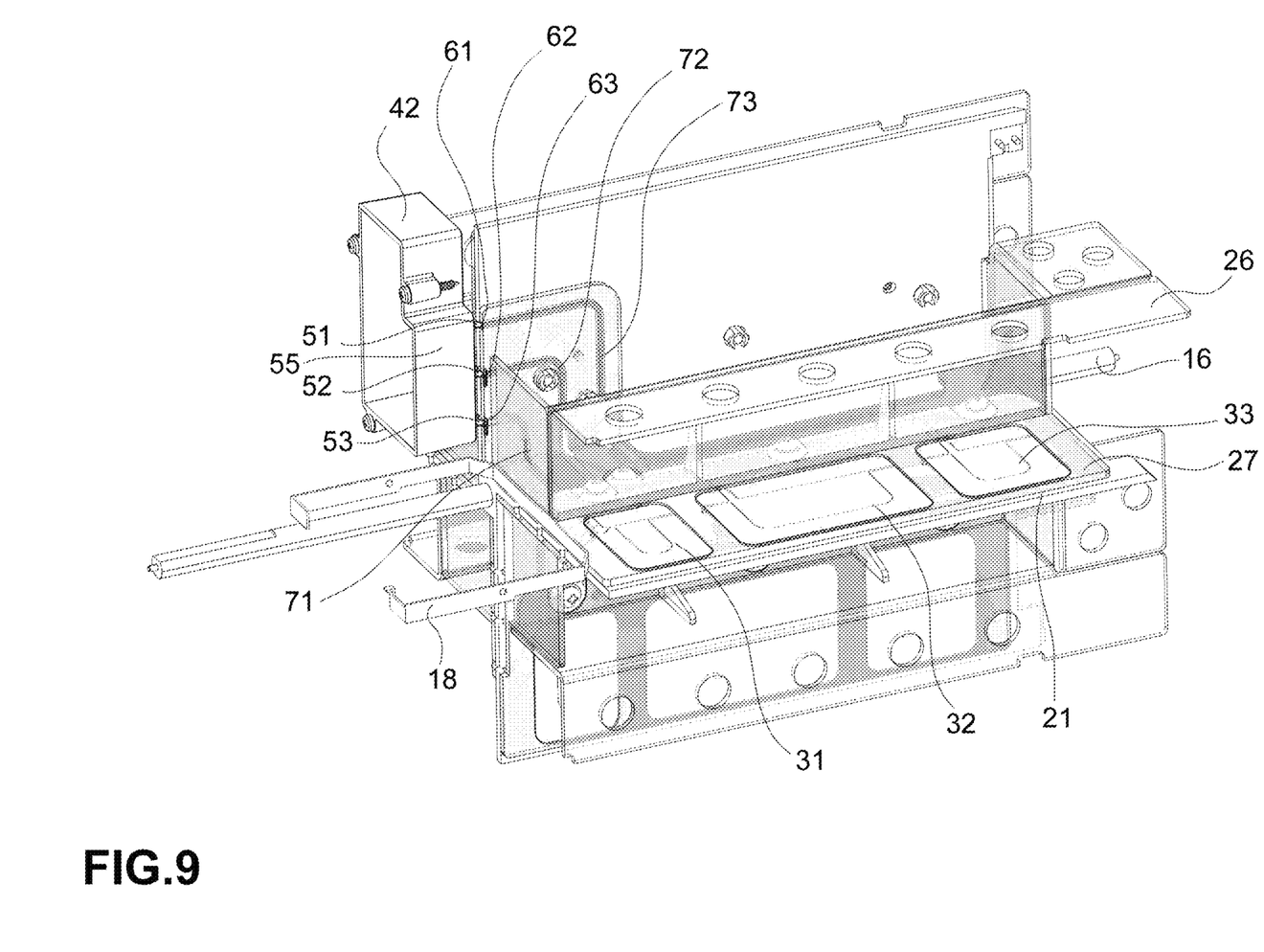
FIG. 9 is a perspective view similar to FIG. 8, illustrated in partial transparency to show some inner parts.

Corresponding sets of three movable electrical contacts 61, 62, 63 are provided on each of the four axial walls, wherein each movable contact is presented on an edge of one of the four axial walls, and is electrically connected, via a respective conductor 71-73, to a respective one of the three electrode plates 31-33 provided on the same axial wall (FIG. 9). The movable electrical contacts on each axial wall are radially spaced in a manner corresponding to the radial spacing of the stationary electrical contacts.

At least one contact 52 of the three stationary electrical contacts 51-53 is electrically connected to the high voltage transformer 42 to receive from it a high voltage shock to be transmitted to the corresponding electrode plate. According to a preferred embodiment, the second intermediate electrode plate 32 is electrified, while the first 31 and third 33 electrode plates are grounded.

According to a preferred embodiment, the three electrode plates are electrified in such a way that between two axially consecutive electrode plates, one is electrified and the axially following one is simply grounded, so that when the electrified plate is activated, the electric current reaches the grounded electrode plate by passing through the body of the prey, electrocuting it.

Figure 10:
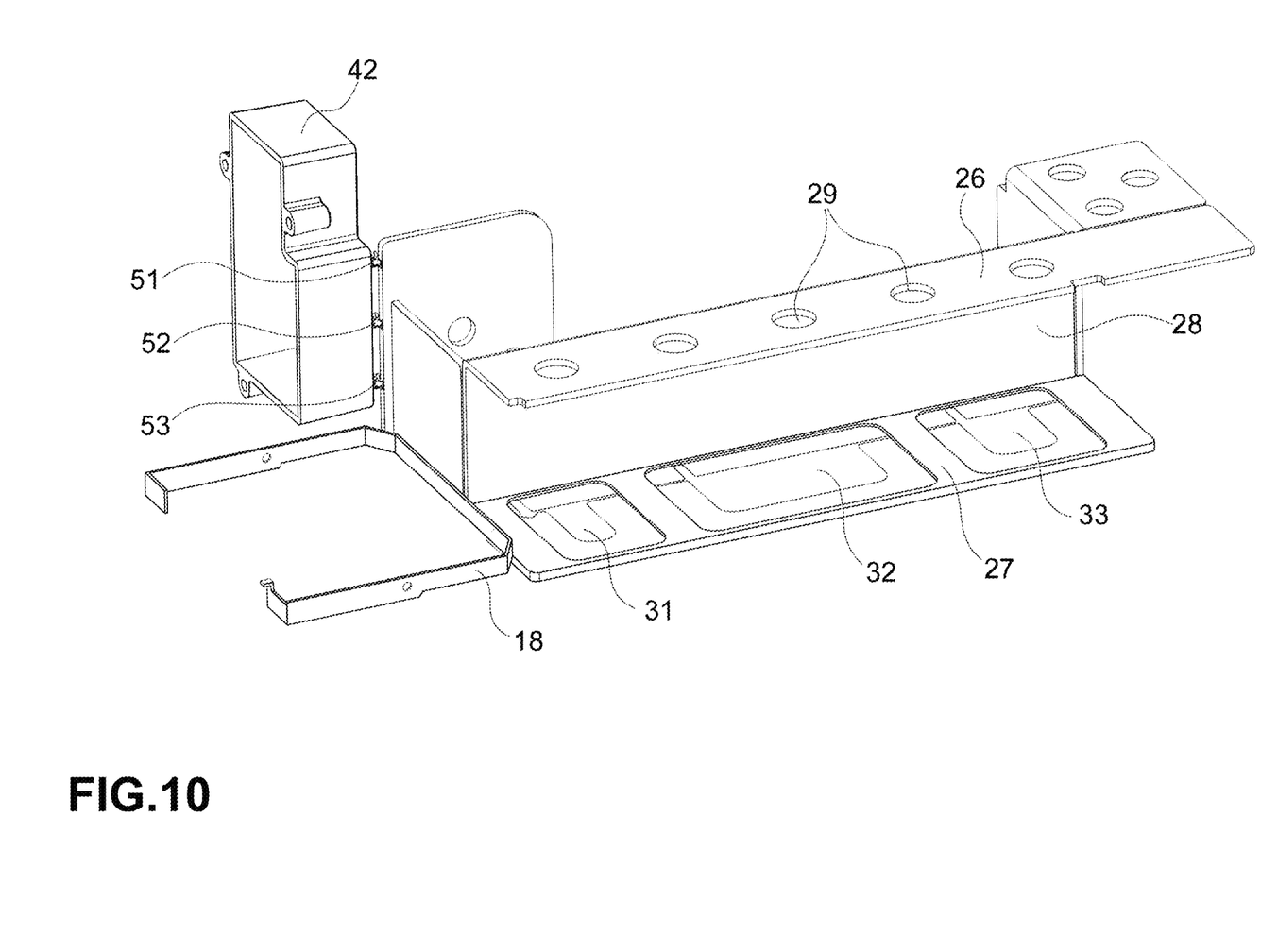
FIG. 10 is a simplified perspective view of the internal components shown in FIG. 8.

Preferably, the second intermediate electrode plate 32 has a larger axial dimension than the first 31 and the third 33 electrode plates (FIG. 10), so as to ensure that, at the time of the electrical shock, the body of the prey is always in contact with the second electrode plate and with at least one of the first and third electrode plates grounded.

In this way, electrocution is assured, irrespective of the size of the prey. Indeed, if the prey is a large rat, it will contact all three electrode plates simultaneously. If, on the other hand, the prey is a smaller mouse, it will be in contact with the first and second electrode plates at the moment of shock, and should it jump backwards away from the feeder, its body will come into contact partly with the second plate and partly with the third one.

According to the illustrated exemplary embodiment, the stationary contacts 51-53 are arranged on the edge of a fixed vertical wall, and the conductors on the rotor that bi-univocally connect each movable contact with the respective electrode plate, run partly on the wall bearing the respective electrode plate, and partly on the adjacent wall, according to an essentially L-shaped arrangement (FIG. 9).

In order to ensure effective electrification, according to a preferred embodiment, the three stationary electrical contacts 51-53 are sliding contacts, elastically mounted protruding from the edge of the wall, so that they interfere with and touch the respective movable contacts when the rotor rotates 90°, changing its angular position.

Alternative embodiments, which are not illustrated, may provide for the stationary contacts to be arranged horizontally aligned, and for the movable contacts to be correspondingly arranged on the edge of the same rotor wall that provides the electrode plates connected to these movable contacts.

According to a preferred embodiment, the top horizontal wall has a plurality of through openings 29 (FIGS. 8 and 10) to give the prey the impression that the killing chamber is more spacious than it actually is, in order to overcome the natural distrust of the animal. The dimensions of the killing chamber are chosen suitably narrow so that the prey is substantially prevented from jumping backwards and evading contact with the electrode plates.

The activation member 18 is in this example articulated as a rocker arm, with a horizontal bar arranged adjacent to the edge of the feeder, a horizontal fulcrum and an end that actuates a switch (not illustrated).

The rotor is able to stably and alternately take four predetermined angular positions, in each of which one of the four axial walls is arranged horizontally and forms the floor of the killing chamber, with its respective electrode plates facing upwards. In this arrangement, the second intermediate electrode plate of the horizontal wall is connected to the high-voltage transformer. When a prey enters the killing chamber and activates the activation member 18, this triggers at least one electrical shock of a predetermined duration, e.g. 30 seconds, sending current to the intermediate electrode plate and producing the electrocution of the prey. Four 30-second shocks with a pause interval of 2 seconds each may be activated.

Once the electrical shock has taken place, the rotor is rotated 90 degrees, functioning as a trap door that discharges the prey carcass from the killing chamber to the lower bin, where there may be an isopropyl alcohol solution that prevents the development of odours. Rotation of the rotor aligns a new free killing chamber between the entrance 14 and the feeder, so the trap is ready for a new cycle.

Rotation of the rotor may alternatively be produced by an electric motor, which automatically rotates the rotor at the end of each killing cycle. Alternatively, the rotation may be produced by a spring-loaded mechanical drive, which is released as a result of a command given by the high-voltage transformer itself or by a control unit that oversees the operation of the device as a whole, i.e, also the operation of the high-voltage transformer and all the electrical components described herein.

As can be appreciated, the electrical connection means that only the electrode plates on the rotor wall are electrified, which is temporarily in a horizontal position, forming the floor of the killing chamber.

What is claimed is:

1. An apparatus for the capture and electrocution of pest animals, the apparatus comprising:
    a casing defining a two-storey structure inside it, with
        an upper level, comprising an elongated killing chamber with a feeder at a first end of the killing chamber containing food bait, and an entrance at a second end opposite the first end,
        a lower level, comprising a bin for collection and temporary storage of corpses of killed pest animals,
    electrocution means comprising an electric accumulator, a high voltage transformer connected to the electric accumulator, a plurality of electrode plates located in the killing chamber and electrically and selectively connectable to the high voltage transformer, with an activation member for activating the electrocution means associated with the feeder;
    wherein
    the apparatus further comprises a rotor comprising a rotatable shaft extending along a horizontal axis inside the casing at an intermediate height, the rotor having four axial walls arranged orthogonally to one another along the rotatable shaft, wherein each axial wall of the four axial walls has a face having three electrode plates of said plurality of electrode plates arranged consecutively in an axial direction, the rotor being temporarily lockable in one of four predetermined angular positions in each of which one of the four axial walls is arranged horizontally and has its three electrode plates facing upwards to form part of a floor of the killing chamber;
    the electrocution means further comprise three stationary electrical contacts; and
    each axial wall of the rotor is provided with three movable electrical contacts, each connected to a respective one of the three electrode plates located on a same axial wall, the three movable electrical contacts being temporarily and simultaneously connectable to respective stationary electrical contacts when the axial wall is temporarily blocked horizontally with the three electrode plates facing upwards.

2. The apparatus of claim 1, wherein the three electrode plates on each axial wall of the rotor are electrified such that between two axially consecutive electrode plates, one electrode plate is electrified and an axially subsequent electrode plate is connected to ground.

3. The apparatus of claim 1, wherein the three electrode plates comprise a first electrode plate adjacent to the feeder, a third electrode plate closer to the entrance, and a second electrode plate, intermediate between the first and third electrode plates.

4. The apparatus of claim 3, wherein the second electrode plate is electrified, while the first and third electrode plates are connected to ground.

5. The apparatus of claim 3, wherein the second electrode plate has a larger axial dimension than the first and third electrode plates.

6. The apparatus of claim 1, wherein at least one of the three stationary electrical contacts is electrically connected to the high voltage transformer to receive from the high voltage transformer a high voltage shock to be transmitted to a corresponding electrode plate.

7. The apparatus of claim 1, wherein the feeder has an upper horizontal edge facing the killing chamber, wherein the activation member is adjacent to the upper horizontal edge, and wherein the activation member is configured to be physically touched and activated by a prey overlooking the feeder to trigger an electrical shock.

8. The apparatus of claim 1, wherein the three stationary electrical contacts are radially spaced from each other along a part fixed to the casing, and corresponding groups of three movable electrical contacts are provided on each of said four axial walls of the rotor, wherein each movable electrical contact is presented on an edge of one of said four axial walls of the rotor, and is electrically connected, through a respective conductor, to a respective one of the three electrode plates provided on a same axial wall of the rotor, wherein the three movable electrical contacts on each axial wall of the rotor are radially spaced in a manner corresponding to the three stationary electrical contacts, and wherein at least one of the three stationary electrical contacts is electrically connected to the high voltage transformer to receive from the high voltage transformer a high voltage shock to be transmitted to a corresponding electrode plate.

9. The apparatus of claim 1, wherein the killing chamber has an overall parallelepiped shape, and is delimited by four orthogonal walls:
    an outer side wall defined by an inner surface of the casing;
    an inner side wall, internal with respect to the outer side wall, presented by one of the four axial walls of the rotor;
    a lower horizontal wall, forming part of the floor of the killing chamber, presented by another one of the four axial walls of the rotor; and
    a top horizontal wall, defining a ceiling for the killing chamber, carried by the rotor as a wall parallel to the lower horizontal wall.

10. The apparatus of claim 9, wherein the top horizontal wall has a plurality of distributed through openings.

11. The apparatus of claim 9, wherein the killing chamber is arranged peripherally with respect to the rotor, and the inner side wall is radially spaced from the rotatable shaft.

* * * * *